Figure 1:
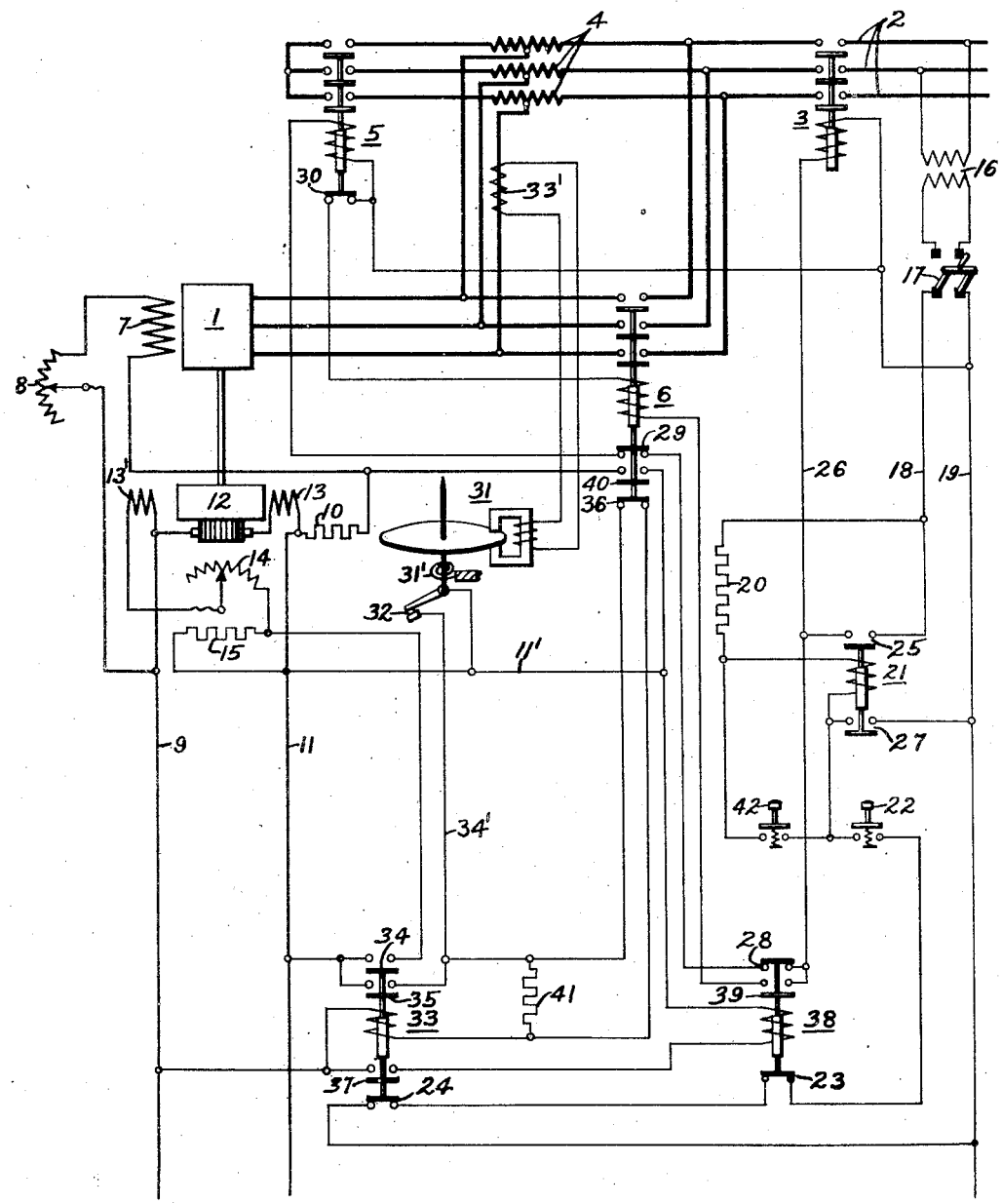

Patented Sept. 9, 1930

1,775,474

UNITED STATES PATENT OFFICE

MAURICE E. REAGAN, OF SWISSVALE, PENNSYLVANIA, ASSIGNOR TO WESTINGHOUSE ELECTRIC & MANUFACTURING COMPANY, A CORPORATION OF PENNSYLVANIA

MOTOR-STARTING SYSTEM

Application filed November 2, 1927. Serial No. 230,464.

This invention pertains to automatic starting systems for electric motors provided with direct-connected exciters or for the motors of motor-generator sets, especially such as are employed in automatic or semi-automatic substations.

One object of this invention is to provide a system for starting a synchronous motor provided with a direct-connected exciter generator.

Another object is to limit the voltage generated by the exciter during the starting period to approximately the same percentage of its normal value as the starting voltage applied to the armature is of the full operating voltage.

A further object of my invention is to provide means for increasing the exciter voltage when the motor-starting current is reduced to a predetermined value.

A still further object is to control the transfer from starting to running connections in accordance with the voltage of a direct-connected exciter.

Another object of my invention is to provide a starting system in which the transfer from starting to running connections is accompanied by a minimum disturbance in the supply circuit.

Further objects will become apparent as the description proceeds.

In practicing my invention, I arrange to impress a reduced, or starting, voltage upon the motor to start it and accelerate it to substantially synchronous speed. During the starting period, the field magnet winding of the motor is connected to the direct-connected exciter. The circuit of the field winding of the exciter is provided with a resistor of such value as to limit the voltage generated by the exciter to a reduced value bearing approximately the same ratio to the normal exciter voltage as the motor starting voltage bears to the normal operating voltage. A similar field-current limiting resistor is provided for the circuit of the motor field winding.

I also provide a low-current relay to be energized by the starting current to control the excitation of the motor field according to the value of that current. Since the starting current immediately rises to a maximum value and then gradually diminishes to a minimum value as the speed of the motor increases and approaches synchronous speed, the relay is adjusted to operate when the starting current diminishes to a minimum value indicative of substantially synchronous speed. It then causes the limiting resistor in the circuit of the field winding of the exciter to be shunted to render the resistor ineffective. The exciter voltage immediately increases. At a definite exciter voltage, corresponding to a condition of motor field excitation at which a minimum disturbance will be caused by a transfer from starting to running conditions, the starting or reduced voltage is withdrawn from the motor and normal full operating voltage is applied. The resistor in the circuit of the motor field winding is shunted and the motor is operatively energized.

Figure 2:
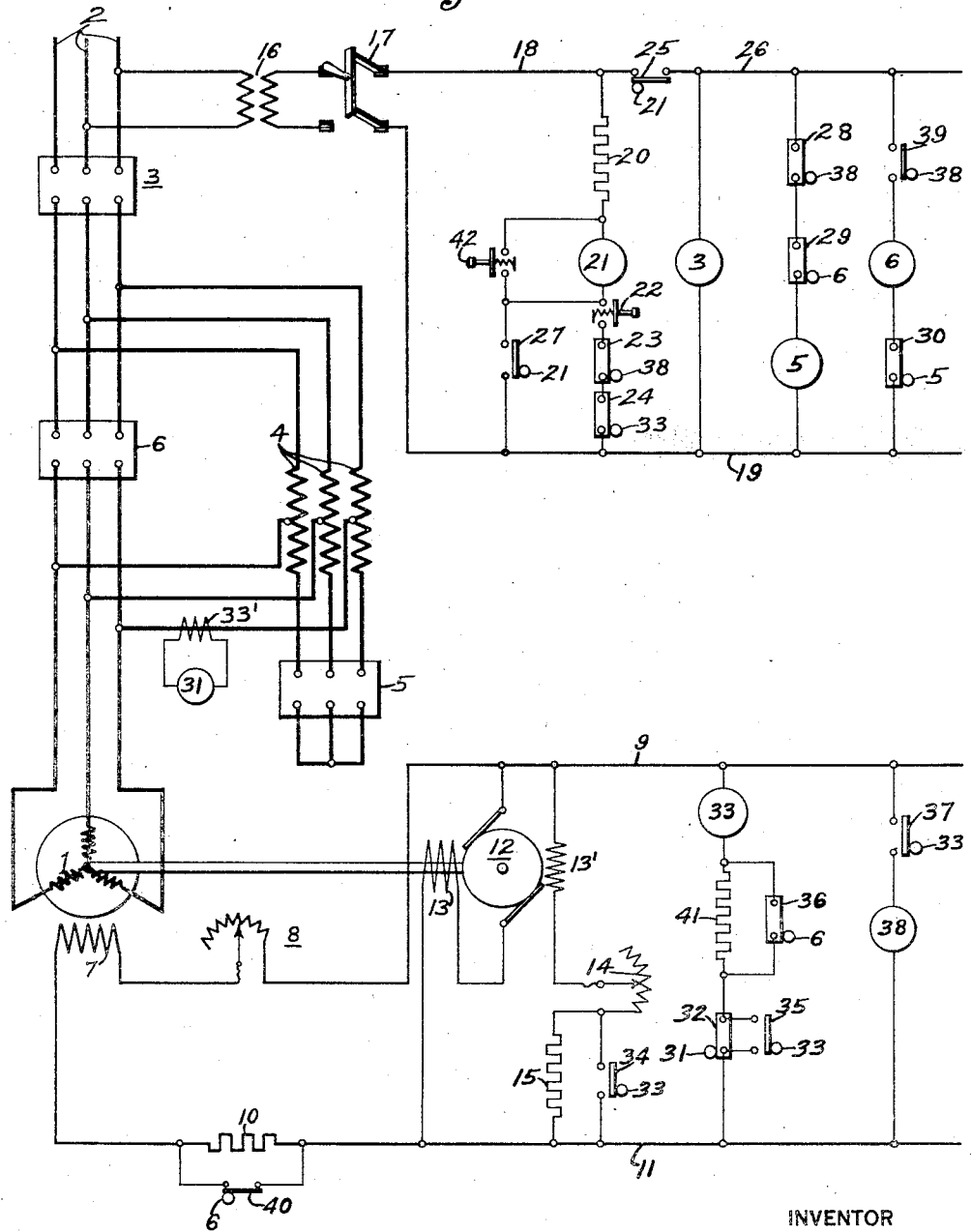

For a clearer understanding of my invention, reference should be had to the accompanying drawings, in which Figure 1 is a complete circuit diagram of the system employed to obtain the results above-mentioned, and Fig. 2 is a schematic diagram of the circuits shown in full in Fig. 1.

In Fig. 1 a synchronous motor 1 is adapted to receive power from an alternating-current source 2 through a main circuit interrupter 3. Starting transformers 4 and a starting contactor 5 are provided to supply a reduced voltage to the motor armature for starting. A running contactor 6 is also provided to connect the armature of motor 1 directly to the source 2 through the circuit interrupter 3.

The field winding of the motor 1 is indicated at 7, and the field circuit includes a rheostat 8, and a current-limiting impedance 10, and is connected to busses 9 and 11 which are energized by a direct-current exciter generator 12 mounted on the shaft of motor 1. The exciter generator 12 has a series field winding 13 and a shunt field winding 13'. The shunt field circuit includes a rheostat 14 and a current-limiting resistor 15.

Energy for the operation of the alternating-current control devices is taken from the source 2 by means of a transformer 16. A switch 17 is employed to connect the alternating-current control busses 18 and 19 to the secondary of the transformer 16.

The various other elements comprising the control apparatus will be described in connection with the following description of the operation of my invention.

For initiating the operation of my starting system, a switch 22 is provided. Although this switch is illustrated as of the push-button type, it is to be understood that it may be operated automatically in response to any circuit conditions, or it may be operated from a distance by any system of supervisory control.

The closing of the switch 22 completes a circuit from the control bus 18, through a resistor 20, the operating coil of a relay 21 and contacts 23 and 24 of relay 38 and 33, respectively, the said contacts being closed when the relays are de-energized. The establishment of this circuit causes the energization of the relay 21, to close its contacts 25 and 27. The closing of the contact 27 completes a locking circuit for the relay 21 which is in parallel with the switch 22 and the contacts 23 and 24.

The closing of the contact 25 energizes an auxiliary control bus 26 and the operating coil of the main circuit breaker 3.

The closure of contact 25 simultaneously establishes a circuit from the control bus 26 through a contact 28 of relay 38, which is closed when the relay 38 is deenergized, through a contact 29, which is closed when the running contactor is open, through the operating coil of the starting contactor 5 and thence to the control bus 19. The closing of the contact 25 thus results in the operation of the main circuit breaker 3 and of the starting contactor 5. A reduced starting voltage is thereupon impressed upon the motor windings to start the motor.

A relay 31, which is illustrated as an induction relay, although any suitable relay may be employed, is disposed to be influenced in accordance with the motor-starting current through a current transformer 33' connected in one of the starting leads. The contact 32 of the relay 31 is normally biased to its closed position by a spring 31'.

When reduced voltage is applied to the motor armature, a comparatively large current immediately flows in the motor windings and the contacts 32 of the relay 31 are thereby opened.

The motor starts on reduced voltage in the well-known manner and its speed increases to substantially synchronous speed at which time the energization of the relay 31 diminishes sufficiently to permit its contact 32 to close, and the voltage across the generator busses 9 and 11 increases sufficiently to energize the operating coil of the relay 33, even though the generator field circuit includes the resistor 15, so that the generator voltage is still below normal.

The closure of the switch 32 of relay 31 completes the circuit of relay 33 from the bus 9, through the operating coil of the relay 33, through a contact 36 which is closed when the running switch 6 is open, through a conductor 34', the contact 32 of relay 31 and thence by conductor 11' to the bus 11.

The relay 33 then operates to close the contacts 34, 35 and 37 and opens the contact 24. The opening of contact 24 has no effect on the remainder of the system since, as before stated, it is shunted by contact 27, already closed by the operation of relay 21. The closing of contact 35 completes a locking circuit for the relay 33 which is in parallel with the contacts 32 of the relay 31, so that any further changes in the current supplied to the motor armature will be ineffective to change conditions in the control circuit. The closing of the contact 34 short-circuits the resistor 15 in the generator field circuit, thereby permitting the generator excitation and the generated voltage to be increased.

When the generator voltage has increased to its normal operating value, it causes the operation of the relay 38, by means of a circuit established by the closing of contact 37, from the exciter bus 9 through the operating coil of relay 38, and the conductor 11' to bus 11.

The relay 38 then opens its contacts 28 and 23 and closes a contact 39. The opening of contact 23, which is shunted by contact 27, already closed by relay 21, does not change the conditions in any part of the circuit. The opening of the contact 28, however, interrupts the circuit through the operating coil of the starting switch 5 which is thereupon opened.

Simultaneously, the back contact 30 of the starting switch 5 closes to complete a circuit from the control bus 26, through contact 39, closed by relay 38, through the operating coil of running switch 6, through contact 30, and thence to the control bus 19.

The energization of the operating coil of the running switch 6 causes the main contacts of the latter to be closed, as well as the contact 40, and the contacts 29 and 36 to be opened. The opening of the contact 29 further interrupts the circuit to the closing coil of the starting switch 5. Closing of the contact 40 short-circuits the impedance 10 in the motor field circuit, thus allowing a greater current to flow through the motor field.

The opening of the switch 36 removes a short-circuit from across the resistor 41 which is left in series with the operating coil of relay 33 and the contact 35 closed thereby, across the exciter busses 9 and 11. The resistor 41 is so designed that the current through the circuit which is traced above is sufficient to maintain the relay 33 in its energized position in view of the increased exciter voltage.

As a result of the foregoing operations, the motor 1 is connected directly to the alternating-current source 2, and is running at synchronous speed.

When it is desired to stop the motor, this may be accomplished by the closing of the switch 42, which is also shown as a push-button switch, although it may be operated automatically or by supervisory control. The closing of the switch 42 short-circuits the operating coil of the relay 21 which, being deenergized, opens contacts 25 and 27. The opening of the contact 25 deenergizes the operating coil of the running switch 6 to disconnect the motor from the line 2, and the relays 33 and 38 are denergized as the generator and motor slow down.

The motor 1 is thereby disconnected from the alternating source 2, and all of the control equipment resumes its deenergized position, whereupon the system is ready for a repetition of the above described starting cycle.

Fig. 2, showing the schematic diagram of the circuits of Fig. 1, is included to simplify the tracing of the various control circuits. The usual conventions are employed to indicate the operating coils of the various relays and the contacts opened or closed thereby, but, as the operation of the system as shown in Fig. 2 is identical with that as shown in Fig. 1, it is not repeated.

One of the chief advantages of my motor starting system is that the partial excitation of the motor field during the starting period produces a high starting torque.

Another advantage resides in the fact that there is a definite value of excitation, at which the disturbance in the supply circuit caused by the transfer from starting to running connections is a minimum and it is possible to calibrate the relay 38 which controls the transfer from starting to running connections, to operate when the exciter voltage reaches this optimum value.

I claim as my invention:

1. In a starting system for a synchronous motor with a field-magnet winding, a low-voltage starting source and a full-voltage running source, an exciter for energizing the motor field, an impedance, means for connecting the exciter to the motor field winding in series with the impedance, means for connecting the motor armature to said low voltage source, means for increasing the exciter voltage in response to a decrease in starting current as the motor approaches synchronous speed, and means responsive to the exciter voltage for transferring the armature to the full-voltage source, and shunting said impedance, 2. In a starting system for a synchronous motor having a field winding, a low-voltage starting source and a full-voltage running source, means for connecting the motor armature to said starting source, an exciter for energizing the motor field, and an impedance connected in series with the motor field for limiting the field current supplied by the exciter during the starting period, means for increasing the exciter voltage in response to a decrease in starting current as the motor approaches synchronous speed, and means responsive to exciter voltage for transferring the armature to said full-voltage source.

3. In a motor starting system, the combination with a low-voltage starting source and a full-voltage running source, and an exciter for supplying current to the motor field winding of an impedance in series with the exciter and the motor field winding, means for connecting the motor armature to said starting source, means for increasing the exciter voltage, and means for automatically transferring the armature to said full-voltage source and shunting said impedance in response to said increased exciter voltage.

4. The method of starting a synchronous motor, the field of which is energized through an impedance by an exciter, which consists in starting the motor on a low voltage, increasing the exciter voltage by increasing its field current in accordance with a predetermined decrease in motor current as the motor approaches synchronous speed, transferring the motor to a source of normal operating voltage in accordance with the increase in exciter voltage to its normal value and shunting the impedance in the motor field circuit.

5. The method of starting a synchronous motor, the field of which is connected to an exciter in series with an impedance, which consists in applying a low voltage to the motor armature, increasing the exciter voltage by increasing its field current when the motor comes up to speed, and transferring the armature to a source of normal operating voltage and shunting said impedance in accordance with the increased exciter voltage.

6. The method of starting a synchronous motor, whose field winding is connected through an impedance to an exciter, the field of which includes a resistor, which consists in connecting the motor armature to a source of low voltage, shunting the resistor in the exciter field circuit to increase the exciter voltage when the motor reaches synchronous speed, and transferring the armature to a source of normal voltage and shunting the impedance in the motor field circuit when the exciter voltage increases to a predetermined value.

7. The method of starting a synchronous motor whose field winding circuit includes an impedance and is connected to a generator having a resistor in the circuit of its field winding, which comprises applying a reduced voltage to the motor, shunting the resistor in the generator field circuit when the motor starting current has decreased to a predetermined value, to increase the generator field current and voltage, and transferring the motor to a source of normal voltage and shunting the impedance in the circuit of its field winding, when the generator voltage attains a predetermined value.

8. A starting system for a synchronous motor having a field-magnet winding comprising low-voltage starting and full-voltage running sources, a generator having a resistor in its field circuit, an impedance connected in series with the field-magnet winding to said generator, means for connecting the motor to said low-voltage source, means for shunting the resistor in the generator field circuit in response to a decrease in the motor-starting current to a predetermined value, to increase the generator voltage, and means for transferring the motor to said full-voltage source when the generator voltage attains a predetermined value.

9. In a motor-starting system, in combination, a motor provided with a field winding, a high and a low-voltage source of power for the motor, an exciter connected to the motor provided with a field winding and a field resistor, said motor-field winding being connected across the exciter, a resistor connected in series with said motor-field winding, means for connecting the motor to the low-voltage source for starting, a relay responsive to a predetermined reduction of the motor-starting current for shunting the resistor in the exciter field circuit, and means responsive to the closure of said relay and to a predetermined increase in the exciter voltage for effecting a transfer of the motor connection to the high-voltage running source, said means being disposed to shunt the motor-field resistor.

10. In a motor-starting system, in combination, a motor provided with a field winding, a high and a low-voltage source of power for the motor, an exciter connected to the motor provided with a field winding and a field resistor, said motor-field winding being connected across the exciter, a resistor connected in series with said motor-field winding, means for connecting the motor to the low-voltage source for starting, a relay operable to shunt the exciter-field resistor, a low-current relay responsive to the motor-starting current for causing said relay to shunt the exciter-field resistor in response to a predetermined reduction of the motor-starting current, means operable to reconnect the motor to the high-voltage power source, a transfer relay for controlling the operation of said means in response to a predetermined increase in the exciter voltage, said transfer relay being connected to the exciter in response to the operation of the exciter-field-resistor shunting relay, and means disposed to be actuated by the means for reconnecting the motor for shunting the motor-field resistor.

11. A starting system for a synchronous motor comprising a low-voltage starting source, a full voltage running source, starting and running contactors for connecting the motor thereto, a direct-connected generator having a resistor in its field circuit, means for closing the starting contactor, and a relay responsive to starting current for shunting the resistor in the generator field circuit to increase the generator voltage when the starting current has decreased to a predetermined value, and a relay responsive to the generator voltage for opening the starting contactor and closing the running contactor.

In testimony whereof, I have hereunto subscribed my name this 26th day of October, 1927.

MAURICE E. REAGAN.